United States Patent

Yamashita

[11] Patent Number: 5,230,040
[45] Date of Patent: Jul. 20, 1993

[54] TABLE CALCULATING DEVICE
[75] Inventor: Tetsuya Yamashita, Tokyo, Japan
[73] Assignee: Fuji Xerox Co., Ltd., Tokyo, Japan
[21] Appl. No.: 759,949
[22] Filed: Sep. 17, 1991

Related U.S. Application Data

[63] Continuation of Ser. No. 405,768, Sep. 11, 1989, abandoned.

[30] Foreign Application Priority Data

Sep. 21, 1988 [JP] Japan ............... 63-236986

[51] Int. Cl.⁵ .............................................. G06F 15/20
[52] U.S. Cl. ......................................... 395/148; 395/140
[58] Field of Search ...................... 395/155–157, 395/159–161, 140, 148; 364/406

[56] References Cited

U.S. PATENT DOCUMENTS

| | | | |
|---|---|---|---|
| 4,495,600 | 1/1985 | Kikuchi et al. | 364/900 |
| 4,597,045 | 6/1986 | Kiuchi | 364/406 |
| 4,763,356 | 8/1988 | Day, Jr. et al. | 364/900 X |
| 4,788,636 | 11/1988 | Shiratori et al. | 364/474.23 |
| 4,807,123 | 2/1989 | Komatsu et al. | 364/406 X |
| 4,901,221 | 2/1990 | Kodosky et al. | 364/200 |

FOREIGN PATENT DOCUMENTS 166390 7/1987 Japan .

OTHER PUBLICATIONS

"Computer Today", No. 21, pp. 17–21 (In Japanese; no translation available).

*Primary Examiner*—Heather R. Herndon
*Attorney, Agent, or Firm*—Spensley Horn Jubas & Lubitz

[57] ABSTRACT

In a table calculating device, an instructing unit gives an instruction to change data of a graphic pattern corresponding to a value in one of the entries of a table, which is displayed on a display unit. A control unit controls the change of the value corresponding to the changed entry value, which is stored in a memory unit, the graphic pattern data corresponding to the entry value, and the graphic pattern data corresponding to the entry value displayed on the display unit, and causes the display unit to display again the entry value and the graphic pattern data corresponding to the entry value. Accordingly, visual and direct table preparation is possible.

12 Claims, 5 Drawing Sheets

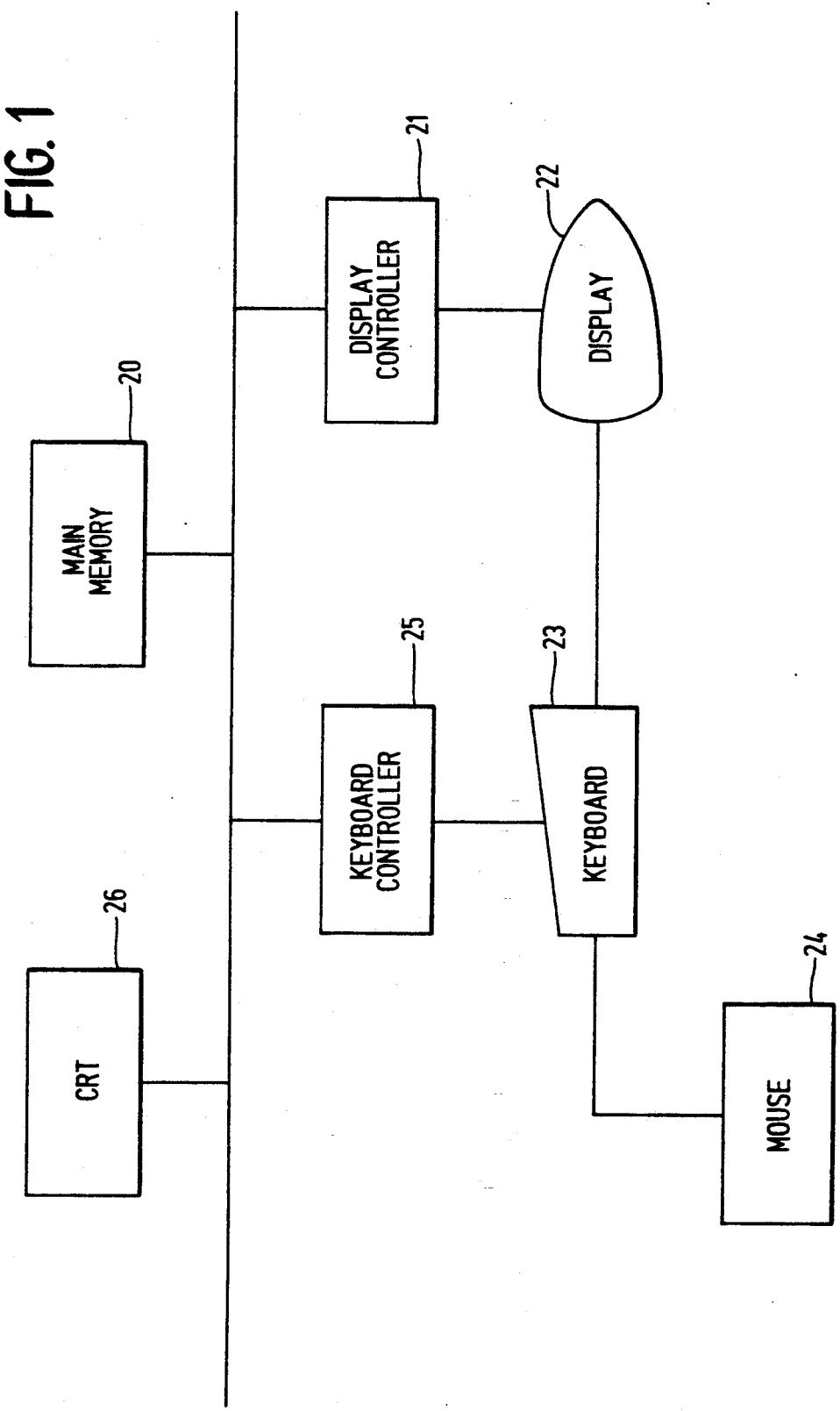

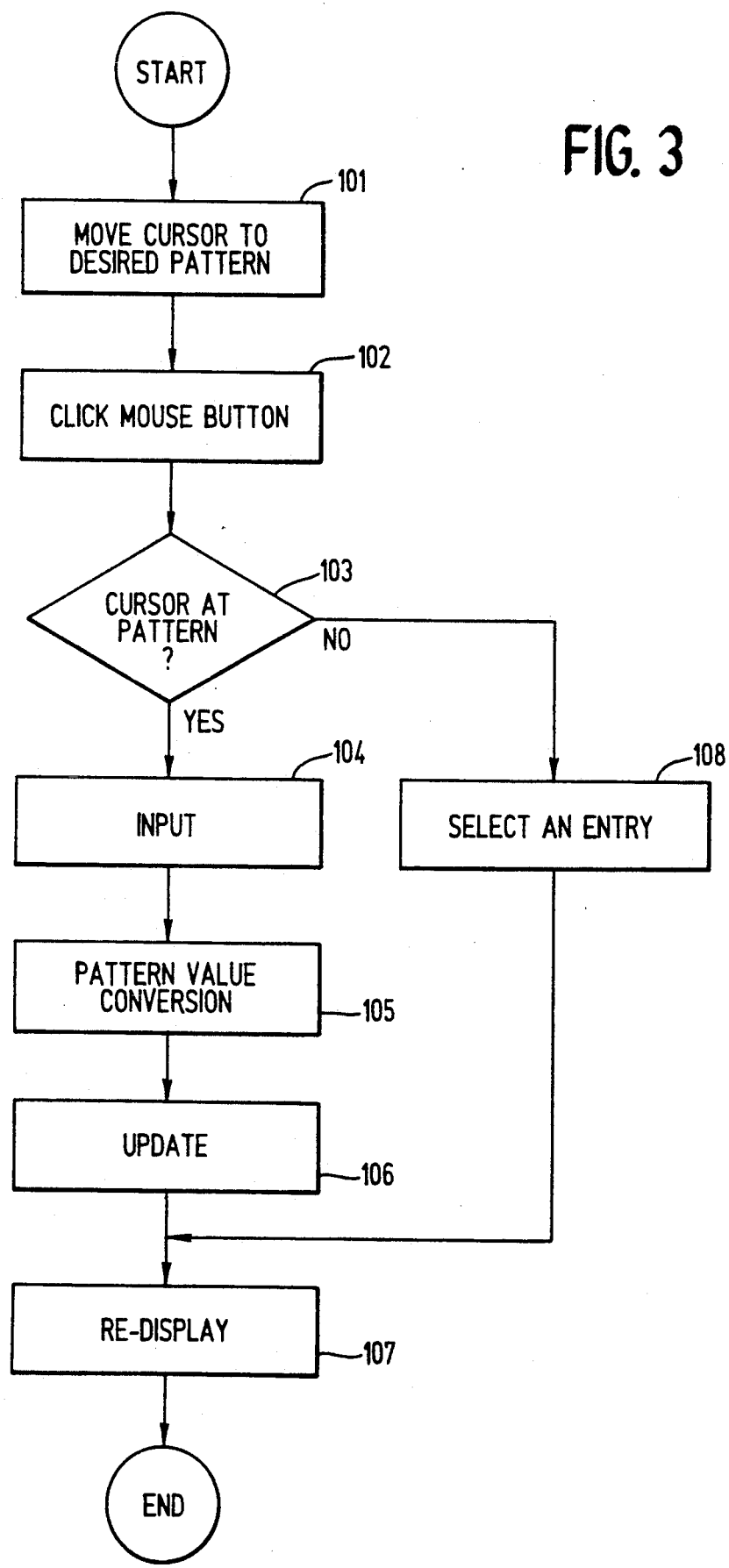

FIG. 4

| | 1 | 2 | 3 | 4 | 5 | 6 |
|---|---|---|---|---|---|---|
| | NAME | HEIGHT | | BLOOD TYPE | | SEX |
| 1 | FUJI TARO | 250 200 150 100 — 172 | | ▨ | O | MAN / WOMAN |
| 2 | FUJI KASHIWAKO | 250 200 150 100 — 154 | | ▨ | A | MAN / WOMAN |
| 3 | FUJI JIRO | 250 200 — 166 | | | | |

FUJI

FIG. 5
PRIOR ART

| | 1 | 2 | 3 | 4 |
|---|---|---|---|---|
| | | UNIT PRICE | QTY. | SALES AMOUNT |
| 1 | MAIN UNIT | 248,000 | 25 | 6,200,000 |
| 2 | CRT | 98,000 | 25 | 2,450,000 |
| 3 | EXPANSION DISK | 165,000 | 6 | 990,000 |
| 4 | PRINTER | 88,000 | 12 | 1,056,000 |

3@2 25

EDIT   COPY   MOVE   STORE   ATTRIBUTE   WIDTH

TABLE CALCULATING DEVICE

This is a continuation of application Ser. No. 07/405,768 filed on Sep. 11, 1989, now abandoned.

BACKGROUND OF THE INVENTION

The present invention relates to a table calculating device in use with an interactive data processing system.

This type of table calculating device is generally used in work stations, personal computers, word processors, and the like. In the conventional table calculating device, a display unit such as a CRT display unit displays a table 10 having a two-dimensional arrangement of entries 11 defined by row and column lines as shown in FIG. 5. The displayed table 10 is based on display data stored in a memory. An operator enters desired data, such as characters and numerical values, for the entries 11 by an input means, for example, a keyboard. The data are stored and may be displayed, with the display attribute designated. Further, a formula 13 may be entered, which indirectly determines data referring to a value of another entry. Where such a formula is used, if a value in the entry being referred to by the formula is changed by an operator, a data processor such as a CPU executes a table calculation using the formula, and displays the result of the table calculation on the display unit. In this example of the prior art, the formula 13 present in a command input section 12 is "3@2". The formula indicates that a value, i.e., "25", in the specified 3rd entry of a table as counted in the row direction is multiplied by a value, i.e., 248,000, in the specified 2nd entry in the row direction. The value "25" in the 3rd entry in the row direction that is to be changed is displayed on the right side of the formula 13. In response to these commands, the CPU calculates the formula 13 and displays the calculation result "6,200,000" in the 4th entry in the row direction. The CPU modifies the data on the table, and stores the modified data into a main memory. In this way, the communication between an operator and the machine, or the table calculating device, progresses.

Usually, the table contains the command input section 12. By using this section, an operator enters various types of commands for table preparation, such as selection of designated entries, change of an input value, formula, and attribute, copy, movement and deletion of entries, change of widths of the row and column lines, etc. Thus, to select an entry in a table by the conventional using table calculating device, a desired or target entry is specified by cursor movement keys or a mouse, and a required value is entered from the keyboard by using edit commands.

The above table preparation work requires many steps using the mouse, keyboard and commands, and further knowledge of related commands. Accordingly, such table preparation work is difficult for an unskilled operator, thereby consuming much time and leading to operation errors.

SUMMARY OF THE INVENTION

Accordingly, an object of the present invention is to provide a table calculating device in which data is visually entered for table preparation, using graphic patterns.

Another object of the present invention is to provide a table calculating device which enables even an unskilled operator to quickly and exactly prepare tables.

Yet another object of the present invention is to provide a table calculating device with improved man-machine communications.

According to the present invention, there is provided a table calculating device which stores display data of tables, presents a display based on the display data by request, enters desired values in entries of tables, and presents a display based on the entered value, the table calculating device comprising memory means for storing values of the entries and specific display data indicative of values corresponding to the entry values, display means for displaying the specific display data as is stored in the memory means, instructing means for instructing the table calculating device to change the specific display data displayed on the display means, and control means for controlling the change of the entry value and the specific display data corresponding to the entry value in response to the change instruction.

With such an arrangement, an operator may visually enter data for table preparation, with use of graphic patterns. Display data of tables, values in entries of tables, and data of a specific graphic pattern indicative of a value corresponding to the entry value are stored into a real memory. By request, the CPU causes the display means to display a table based on the display data and the graphic pattern data. Then, a mouse instructs change of the graphic pattern data on the display means. The CPU determines a value of the entry of the table on the basis of the changed position data. In accordance with the determined entry value, the CPU controls the change of the entry value and the graphic pattern data corresponding to the entry value on the display means. Finally, the CPU stores the resultant entry value and graphic pattern data into the real memory, while at the same time presenting them on the display means.

Other objects, features, and advantages of the present invention will be apparent when carefully reading the detailed description in connection with the accompanying drawings, in which:

BRIEF DESCRIPTION OF THE DRAWINGS

FIG. 1 is a block diagram showing a configuration of a table calculating device according to the present invention;

FIG. 3 is a flowchart useful in explaining an operation of the table calculating device;

FIG. 4 shows an example of tables displayed by a display unit of the table calculating device of FIG. 1; and FIG. 5 shows an example of tables used by the conventional table calculating device.

DETAILED DESCRIPTION OF THE PREFERRED EMBODIMENT

Figure 2A:
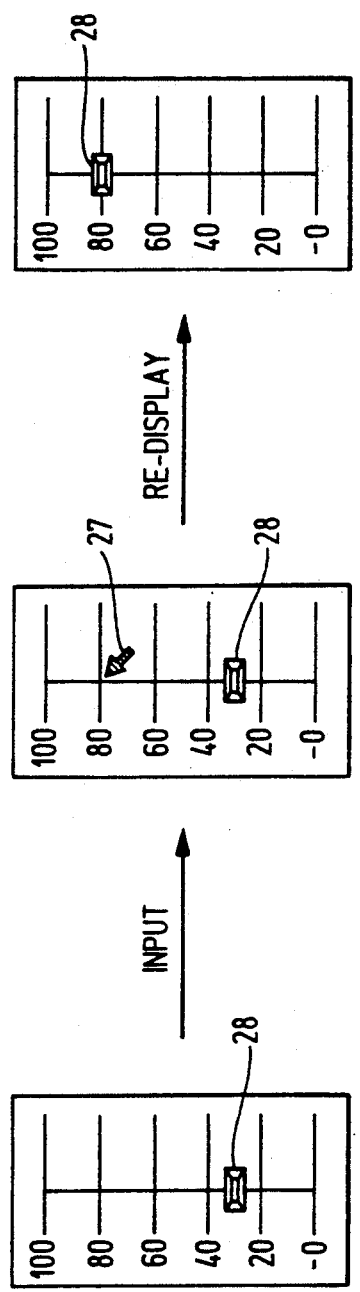
FIGS. 2(a–c) show some specific graphic patterns used in the table calculating device of FIG. 1.

An embodiment of a table calculating device according to the present invention will be described with reference to FIGS. 1 through 4.

FIG. 1 is a block diagram showing a configuration of a table calculating device according to the present invention. In the figure, a main memory 20 comprising a real memory, stores various execution programs including a program to change graphic patterns, display data of tables, data of the graphic patterns, and numerical values in the entries of tables that respectively correspond to the graphic patterns.

A display controller 21, under control of a central processing unit (CPU) 26 to be described later, causes a display unit 22 to visually present the data stored in the main memory 20, such as the table display data, graphic pattern data, and numerical values in the entries of tables that respectively correspond to the graphic pattern data.

Under control of the display controller 21, the display unit 22, which may be a CRT display, for example, displays on the CRT a table corresponding to the data, graphic patterns that are represented by the related data, and numerical values in the entries of tables.

A keyboard 23 is used to enter desired characters and numerical values in the entries of tables by the text of the table calculating device that has been used for entering data.

A mouse 24 as a pointing device is used to point to a graphic pattern and change a graphic pattern displayed on the display unit 22. The mouse 24 is usually provided with two buttons (not shown). By pushing or clicking one of the buttons of the mouse, it points to a desired graphic pattern in the table, a position to which the pattern is to be moved (this position will frequently be referred to as a target position) and a desired menu. The system with which the calculating device is coupled is programmed so as to allow such operations by the mouse. The entry of data by the keyboard 23 and the mouse 24 is done through a keyboard controller 25.

The CPU 26 controls the operations of the respective circuits of the table calculating device, such as the main memory, display controller and keyboard controller, conducts given calculations, and changes the graphic pattern data and values in the table entries.

Figure 2B:
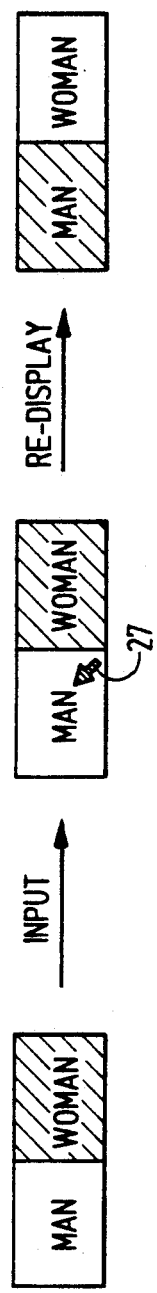
Figure 2C:
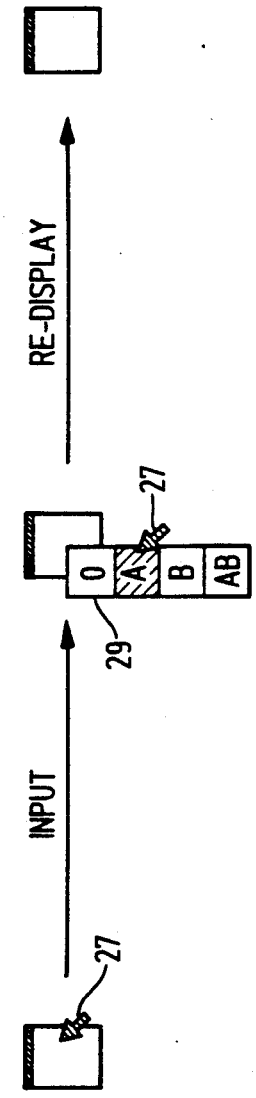

Some graphic patterns are as shown in FIG. 2. An operator moves a graphic cursor (referred simply to a cursor) which moves with the movement of the mouse 24, to a position of a desired graphic pattern. At that position, he clicks one of the buttons of the mouse (e.g., right button in this instance), to specify the pattern. Then, he moves again the cursor to another position, or target position, and clicks the other button, i.e., the left button, to specify the target position. The CPU 26 detects the operations by the mouse and recognizes the specified pattern and the target position, and causes the display unit to display the pattern at the new position specified. To be more specific, in a display of FIG. 2(a), the graphic pattern is a gauge 28 located at a scale division "30". The gauge 28 is moved from the scale division "30" to another scale division "80" on the display. In the display of FIG. 2(b), of a pair of squares, the slanted square containing a character "Woman" as the specified pattern is lit off and the other square containing a character "Man" is lit on. In this way, the specified pattern is moved to the new or target position. In the display of FIG. 2(c), a menu 29 listing several types of blood is designated and displayed, and an item of a character "A" indicative of a blood type is pointed in the menu.

It is evident that the graphic patterns of FIG. 2 are shown by way of example, and therefore any other types of patterns may be selectively used as required.

How a graphic pattern is moved from a position to another will be described with reference to a flowchart shown in FIGS. 3 and 4.

In the figure, an operator moves the cursor 27 toward a pattern 32 in an entry 31 of a table 30 (FIG. 4) by the mouse 24 (step 101). There he clicks the right button of the mouse 24 (step 102). Responding to the clicking of the button, the CPU 26 checks as to if the present position of the cursor 27 is coincident with the position of the pattern (step 103).

When it is the correct position of the pattern, the operator moves the cursor 27 to a position to which he desires to move the pattern, and he clicks the left button of the mouse 24. In response to the clicking of the left button, the CPU 26 calculates the data of the new position of the pattern, i.e., target position data (step 104). Then, it converts the calculated target position data into a value in the entry (step 105).

The way to enter the target position data differs according to the type of a pattern used, but may be performed visually and directly. In the case of the gauge of FIG. 2(a), the target position may be entered by merely selecting a scale mark on which the cursor lies when the mouse button is clicked. In the case of the square marks of FIG. 2(b), the target position is entered by merely selecting the square mark pointed by the cursor when the mouse button is clicked. In the case of the menu of FIG. 2(c), it may be entered by selecting one of the items in the menu on the display at the time of clicking the button. The patterns in FIGS. 2(a) to 2(c) correspond to the patterns of height, blood type, and sex in FIG. 4.

Where a formula is used, the CPU 26 operates the formula by using the changed entry value and another entry value, to obtain a final entry value, and replaces the old entry value in the main memory 20 with the final entry value, while at the same time it prepares the display data for the display unit 22 by using the new entry value. Where no formula is used, the CPU 26 treats the changed entry value as the final entry value, and replaces the old entry value in the main memory 20 with the changed entry value, while preparing the display data by the final entry value (step 106). In accordance with the display data and the updated entry value, the CPU 26 changes the old pattern and the old value in the entry to the new ones, and displays them again on the display unit 22 (step 107).

In step 103, the CPU 26 decides that a position of the cursor 27 when the button is clicked is not coincident with the position of an intended pattern, the CPU 26 judges that the conventional text-basis entry select must be used (step 108), and advances to step 107. In this step 107, the CPU 26 changes the entry value and the pattern on the display unit 22 in accordance with the data entered by the keyboard 23, and displays them again on the display unit 22.

As seen from the foregoing description, the data of a graphic pattern corresponding to a value in an entry of a table that are displayed on the display unit 22 is changed by using the mouse 24. A value in a new entry is determined on the basis of the changed or target position data. The data of a graphic pattern displayed on the basis of the determined new entry value and the entry value corresponding to the graphic pattern data replace the old ones, and are displayed again. Thus, the entering, changing and displaying of values in entries of a table may visually, correlatively and directly be performed in connection with graphic patterns. Accordingly, even unskilled operators can readily and quickly prepare tables. In consequence, the operating speed of the overall system containing the table calculating device is improved.

As described, graphic patterns are used in connection with tables on the display. The pattern allows an operator to enter desired data in entries of a table on the display. Further, the value in an entry corresponding to the data of the graphic pattern can be changed and displayed. Therefore, unskilled operators can readily prepare tables. In this respect, excellent man-machine communication can be performed, so that table can be quickly prepared. The quick table preparation implies the improvement of the system data processing faculty.

While the invention has been described in its preferred embodiment, it should be understood that the words which have been used are words of description rather than limitation and that changes within the purview of the appended claims may be made without departing from the true scope and spirit of the invention in its broader aspects.

What is claimed is:

1. A table calculating device for displaying a table including a plurality of cells arranged in a plurality of rows and columns and for performing a table calculation on the basis of data inputted for each cell of the table, the device comprising:

memory means for storing display data relating to the table, graphic data and numerical value data, the graphic data relating to a graphic pattern composed of a scale constituted by scale lines and an indicium for indicating a location on the scale in at least one of the cells, the scale having a plurality of locations each with a respective numerical value, and the numerical value data indicating the numerical value of the location on the scale indicated by the indicium;

display means receiving data from said memory means for displaying, within the at least one cell of the table, the graphic pattern based on the graphic data and a numeric character based on the numerical value data;

designating means for selecting the at least one cell and designating a location to which the indicium displayed within the cell is to be moved; and control means responsive to said designating means for moving the indicium in the at least one cell on the scale to the location designated by said designating means and for displaying a numeric character constituting the numerical value of the location designated by said designating means.

2. The device according to claim 1, wherein the control means, with respect to the at least one cell, replaces the graphic data and the numerical value data stored in the memory means with new graphic data and new numerical data after moving the indicium.

3. The device according to claim 2, wherein the control means generate a display, within the at least one cell, of a graphic pattern and a numeric character respectively based on the graphic data and the numerical data currently stored in the memory means.

4. The device according to claim 3 wherein the indicium has a first edge at a reference location of the scale and a second edge movable to the location on the scale which is indicated by the indicium.

5. The device according to claim 2 wherein the indicium has a first edge at a reference location of the scale and a second edge movable to the location on the scale which is indicated by the indicium.

6. The device according to claim 1 wherein the indicium has a first edge at a reference location of the scale and a second edge movable to the location on the scale which is indicated by the indicium.

7. A table calculating device for displaying a table including a plurality of cells arranged in a plurality of rows and columns and for performing a table calculation on the basis of data inputted for each cell of the table, at least one cell having a first area and a second area, with the first area having a graphic pattern extending across a plurality of locations and containing, at each location, at least one respective symbol or character, so that the graphic pattern constitutes a menu, said device comprising:

memory means for storing display data relating to the table, graphic data for producing the graphic pattern, and symbol or character data indicating the symbol or character at a selected location of the graphic pattern;

display means receiving data from said memory means for displaying, within the first area of the at least one cell, the graphic pattern based on the graphic data and, within the second area of the at least one cell, the symbol or character based on the symbol or character data;

designating means for selecting the at least one cell and for designating one location of the graphic pattern of the at least one cell; and control means responsive to said designating means for causing said display means to display, in the second area of the at least one cell, the symbol or character contained at the designated location in place of the symbol or character previously displayed.

8. The device according to claim 7 wherein said control means recognizes the location designated by said designating means and changes the symbol or character data stored in said memory means on the basis of the symbol or character contained in the location designated by said designating means.

9. The device according to claim 8 wherein said control means controls the display based on the symbol or character data currently stored in said memory means.

10. A table calculating device for displaying a table including a plurality of cells arranged in a plurality of rows and columns and for performing a table calculation on the basis of data inputted in each cell of the table, the table containing, in at least one of the cells, a graphic pattern composed of a plurality of sections each located at a respective one of a plurality of selected locations of the cell, and at least one respective symbol or character is in each section, said device comprising:

memory means for storing display data relating to the table, graphic data relating to the graphic pattern, symbol or character data relating to the symbol or character in each section, and location data indicating one of the selected locations;

display means receiving data from said memory means for displaying, within the at least one cell of the table, the graphic pattern and a respective symbol or character in each section of the graphic pattern, with the respective symbol or character in the section at the location indicated by the location data being displayed in a manner which visibly distinguishes that symbol or character from each symbol or character in every other section of the graphic pattern;

designating means for selecting the at least one cell and for designating one section of the graphic pattern; and control means responsive to said designating means for causing said display means to display the respective symbol or character in the section designated by said designating means in the manner which visibly distinguishes that symbol or character from each symbol or character in every other section of the graphic pattern.

11. The device according to claim 10 wherein said control means recognizes the location designated by said designating means and changes the symbol or character data stored in said memory means on the basis of the symbol or character contained in the location designated by said designating means.

12. The device according to claim 11 wherein said control means controls the display based on the symbol or character data currently stored in said memory means.

* * * * *